(12) United States Patent
Yoshida

(10) Patent No.: US 10,226,988 B2
(45) Date of Patent: Mar. 12, 2019

(54) DOOR STRUCTURE FOR A VEHICLE

(71) Applicant: TOYOTA JIDOSHA KABUSHIKI KAISHA, Toyota-shi (JP)

(72) Inventor: Minoru Yoshida, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/270,569

(22) Filed: Sep. 20, 2016

(65) Prior Publication Data

US 2017/0106729 A1 Apr. 20, 2017

(30) Foreign Application Priority Data

Oct. 20, 2015 (JP) .................................. 2015-206561

(51) Int. Cl.
*B60J 5/04* (2006.01)
(52) U.S. Cl.
CPC ........... *B60J 5/0408* (2013.01); *B60J 5/0402* (2013.01); *B60J 5/0463* (2013.01)
(58) Field of Classification Search
CPC ...... B60J 5/0469; B60J 5/0455; B60J 5/0402; B60J 5/0408; B60J 5/0463
See application file for complete search history.

(56) References Cited

U.S. PATENT DOCUMENTS

| | | | | |
|---|---|---|---|---|
| 4,644,699 A * | 2/1987 | Chandler | ............... | B60J 5/0487 296/146.2 |
| 5,465,531 A * | 11/1995 | Herrmeyer | .................. | B60J 1/16 49/413 |
| 5,524,388 A * | 6/1996 | Chowdhury | ............... | B60J 1/17 49/374 |
| 6,015,182 A * | 1/2000 | Weissert | ................ | B60J 5/0404 29/522.1 |
| 6,036,255 A * | 3/2000 | Lester | .................... | B60J 5/0416 296/146.1 |
| 6,039,384 A * | 3/2000 | Schulte | .................. | B60J 5/0402 296/146.2 |
| 6,212,851 B1 * | 4/2001 | Visconti | ................. | B60J 5/0402 296/146.1 |
| 6,328,373 B1 * | 12/2001 | Pacella | .................. | B60J 5/0402 296/146.5 |

(Continued)

FOREIGN PATENT DOCUMENTS

| JP | 2009-23473 | 2/2009 |
|---|---|---|
| JP | 2014-18806 | 2/2014 |

*Primary Examiner* — Justin B Rephann
(74) *Attorney, Agent, or Firm* — Oblon, McClelland, Maier & Neustadt, L.L.P.

(57) ABSTRACT

A door structure for a vehicle that includes a door outer panel; a door inner panel including a first join-receiving portion protruding to the vehicle upper side relative to a vehicle upper side end of the door outer panel, and a second join-receiving portion protruding to the vehicle upper side relative to the vehicle upper side end of the door outer panel and being disposed to be spaced apart from the first join-receiving portion in a vehicle horizontal direction along the vehicle upper side end of the door outer panel; and a frame portion formed using a material with a different thermal expansion coefficient from the door inner panel, the frame portion including a first joining portion joined to the first join-receiving portion by a rivet and a second joining portion joined to the second join-receiving portion by a rivet.

6 Claims, 4 Drawing Sheets

(56) References Cited

U.S. PATENT DOCUMENTS

| | | | | |
|---|---|---|---|---|
| 6,393,767 B1* | 5/2002 | Fukumoto | B60J 5/0402 | 49/503 |
| 6,732,474 B1* | 5/2004 | Eck | B60J 5/0416 | 49/502 |
| 6,758,512 B2* | 7/2004 | Dobbs | B60J 5/0408 | 296/146.5 |
| 6,886,881 B1* | 5/2005 | Henderson | B60J 1/08 | 296/146.2 |
| 6,920,720 B2* | 7/2005 | Sommer | B60J 5/0406 | 49/502 |
| 7,093,393 B2* | 8/2006 | Hock | B60J 5/0402 | 296/146.9 |
| 9,815,353 B2* | 11/2017 | Jang | B60J 5/0463 | |
| 2002/0078631 A1* | 6/2002 | Hock | B60J 5/0402 | 49/502 |
| 2003/0089044 A1* | 5/2003 | Okahara | E05F 11/382 | 49/414 |
| 2004/0049989 A1* | 3/2004 | Florentin | B60J 5/0411 | 49/502 |
| 2004/0221512 A1* | 11/2004 | Hoffman | B60J 5/0402 | 49/440 |
| 2005/0150166 A1* | 7/2005 | Seksaria | B60J 5/0416 | 49/352 |
| 2005/0212324 A1* | 9/2005 | Mittermeier | B60J 5/0406 | 296/146.5 |
| 2007/0261313 A1* | 11/2007 | Ruppert | B60J 5/0406 | 49/502 |
| 2008/0127569 A1* | 6/2008 | Boddy | B60J 5/0402 | 49/502 |
| 2009/0015035 A1* | 1/2009 | Baumgart | B60J 5/0416 | 296/146.2 |
| 2009/0145043 A1* | 6/2009 | Yamashita | B60J 5/0402 | 49/502 |
| 2009/0165392 A1* | 7/2009 | Totani | B60J 5/0401 | 49/502 |
| 2012/0174491 A1* | 7/2012 | Clark | B60J 5/0402 | 49/490.1 |
| 2012/0299329 A1* | 11/2012 | Schidan | B60J 5/0408 | 296/146.7 |
| 2013/0061526 A1* | 3/2013 | Grudzinski | B60J 1/17 | 49/258 |
| 2014/0110964 A1* | 4/2014 | Schijve | B60J 5/0422 | 296/146.6 |
| 2014/0284961 A1* | 9/2014 | Otake | B60J 5/0455 | 296/146.6 |
| 2015/0048646 A1* | 2/2015 | Yokota | B60J 5/0408 | 296/146.2 |
| 2015/0108785 A1* | 4/2015 | Yokota | B60J 5/0408 | 296/146.5 |
| 2015/0130216 A1* | 5/2015 | Im | B60J 5/0469 | 296/146.2 |
| 2015/0135600 A1* | 5/2015 | Yokota | B60J 5/0402 | 49/502 |
| 2015/0202950 A1* | 7/2015 | Garimella | B60J 5/0443 | 49/501 |
| 2016/0121701 A1* | 5/2016 | Yoshida | B60J 1/004 | 49/372 |
| 2016/0200181 A1* | 7/2016 | Sato | B23K 11/14 | 296/146.2 |

\* cited by examiner

DOOR STRUCTURE FOR A VEHICLE

CROSS-REFERENCE TO RELATED APPLICATION

This application is based on and claims priority under 35 USC 119 from Japanese Patent Application No. 2015-206561 filed on Oct. 20, 2015, the disclosure of which is incorporated by reference herein.

BACKGROUND

Technical Field

The present disclosure relates to a door structure for a vehicle.

Related Art

A vehicle door structure that improves the stiffness of a door main body is disclosed in Japanese Patent Application Laid-Open (JP-A) No. 2009-23473. A door main body at which this vehicle door structure is employed is structured with a door outer panel that is disposed at a vehicle width direction outer side and a door inner member that is disposed at the vehicle width direction inner side of the door outer panel.

The stiffness of the door main body is improved by a door reinforcement portion being provided at the door main body; the door reinforcement portion is fabricated of die-cast aluminium or fabricated of an extruded aluminium alloy.

However, in a vehicle door that is formed using plural materials with different thermal expansion coefficients, warping may occur at the door outer panel in response to variations in environmental temperature, and the door outer panel constitutes part of the exterior design of the vehicle.

SUMMARY

In consideration of the circumstances described above, the present disclosure provides a vehicle door structure that may suppress warping of a door outer panel of a vehicle door that is formed using plural materials with different thermal expansion coefficients.

A first aspect of the present disclosure provides a door structure for a vehicle, including:
  a door outer panel that structures a portion of a door for a vehicle and is disposed at the vehicle outer side thereof, the door for a vehicle opening and closing a door aperture portion provided in the vehicle;
  a door inner panel that is disposed at the vehicle inner side relative to the door outer panel and is joined to the door outer panel, the door inner panel including
    a first join-receiving portion that, viewed from the vehicle outer side, protrudes to the vehicle upper side relative to a vehicle upper side end of the door outer panel, and
    a second join-receiving portion that, viewed from the vehicle outer side, protrudes to the vehicle upper side relative to the vehicle upper side end of the door outer panel and that is disposed to be spaced apart from the first join-receiving portion in a vehicle horizontal direction along the vehicle upper side end of the door outer panel; and
  a frame portion that is formed using a material with a different thermal expansion coefficient from the door inner panel, the frame portion including a first joining portion that is joined to the first join-receiving portion by a rivet and a second joining portion that is joined to the second join-receiving portion by a rivet.

According to the door structure for a vehicle of the first aspect, the door outer panel is joined to the door inner panel, and the first joining portion and second joining portion of the frame portion are joined by rivets to the first join-receiving portion and the second join-receiving portion, respectively, of the door inner panel. Thus, the door outer panel, the door inner panel and the frame portion are made integral.

In the first aspect, the frame portion and the door inner panel have mutually different thermal expansion coefficients. Therefore, if the door for a vehicle including the frame portion and the door inner panel is warmed or cooled, the frame portion and the door inner panel act to expand or contract by mutually different proportions. Consequently, because the expansion or contraction of the door inner panel is restricted by the frame portion (and the expansion or contraction of the frame portion is restricted by the door inner panel) the locations of the door inner panel to which the frame portion is joined (i.e., the first join-receiving portion and the second join-receiving portion) and surrounding portions are deformed.

In the first aspect, however, the first join-receiving portion and the second join-receiving portion provided at the door inner panel protrude further to the vehicle upper side than the vehicle upper side end of the door outer panel, as viewed from the vehicle outer side. Therefore, restriction by the frame portion of expansion or contraction of a region of the door inner panel that opposes the door outer panel is moderated. As a result, the region of the door inner panel that opposes the door outer panel may expand or contract to follow the door outer panel. Consequently, warping of the door outer panel in response to temperature changes of the door for a vehicle may be suppressed.

A second aspect of the present disclosure provides the door structure for a vehicle according to the first aspect, wherein at least one of the first joining portion with the first join-receiving portion and the second joining portion with the second join-receiving portion is joined by a plurality of the rivet that are disposed to be spaced apart in the vehicle vertical direction.

According to the door structure for a vehicle of the second aspect, a joining strength between the door inner panel and the frame portion may easily be adjusted by adjusting numbers and the like of the rivets joining the first joining portion with the first join-receiving portion and the second joining portion with the second join-receiving portion.

A third aspect of the present disclosure provides the door structure for a vehicle according to the first or second aspects, wherein:
  the frame portion includes
    an upright frame portion that extends to the vehicle upper side from the second join-receiving portion, and
    a curved frame portion that extends toward the first join-receiving portion from an end portion at the vehicle upper side of the upright frame portion, a central portion in a length direction of the curved frame portion being curved in a shape that protrudes toward the opposite side thereof from the side at which the door inner panel is disposed; and
  an end portion at the vehicle lower side of the curved frame portion includes the first joining portion, and an end portion at the vehicle lower side of the upright frame portion includes the second joining portion, wherein
  the first joining portion is joined to the first join-receiving portion and the second joining portion is joined to the second join-receiving portion in a state in which the first joining portion is disposed at the vehicle upper side relative to the second joining portion.

According to the door structure for a vehicle of the third aspect, the first joining portion provided at the curved frame portion of the frame portion and the second joining portion provided at the upright frame portion are joined to the first join-receiving portion and the second join-receiving portion, respectively, of the door inner panel. In this structure, when the door for a vehicle is warmed or cooled, because the frame portion and the door inner panel act to expand or contract by mutually different proportions, the first joining portion and second joining portion of the frame portion move apart from or closer towards one another. Consequently, in a structure in which the first joining portion and second joining portion of the frame portion are joined to the first join-receiving portion and second join-receiving portion, respectively, of the door inner panel in a state in which the first joining portion and second joining portion of the frame portion are disposed at the same position in the vehicle vertical direction, the frame portion can be deformed with a deformation origin being at the central portion in the length direction of the curved frame portion.

In the third aspect, however, the first joining portion and second joining portion of the frame portion are joined to the first join-receiving portion and second join-receiving portion, respectively, of the door inner panel in the state in which the first joining portion (of the curved frame portion) of the frame portion is disposed at the vehicle upper side relative to the second joining portion (of the upright frame portion) of the frame portion. Therefore, an origin of deformation of the frame portion when the first joining portion and the second joining portion move apart from or closer towards one another may be shifted toward the upright frame from the central portion in the length direction of the curved frame portion. Thus, a change in clearance between the central portion in the length direction of the curved frame portion and a vehicle body panel or the like that forms the door aperture portion may be reduced.

The door structure for a vehicle of the first aspect has an excellent effect in that warping that occurs at the door outer panel of the door for a vehicle that is formed using plural materials with different thermal expansion coefficients may be suppressed.

The door structure for a vehicle of the second aspect has an excellent effect in that a joining strength between the door inner panel and the frame portion may be adjusted easily.

The door structure for a vehicle of the third aspect has an excellent effect in that a change, in response to a change in environmental temperature, in a clearance between the central portion in the length direction of the curved frame portion and a vehicle body panel or the like that forms the door aperture portion may be suppressed.

BRIEF DESCRIPTION OF THE DRAWINGS

Exemplary embodiments of the present disclosure will be described in detail based on the following figures, wherein.

DETAILED DESCRIPTION

Vehicle Door Structure According to First Exemplary Embodiment

Figure 1:
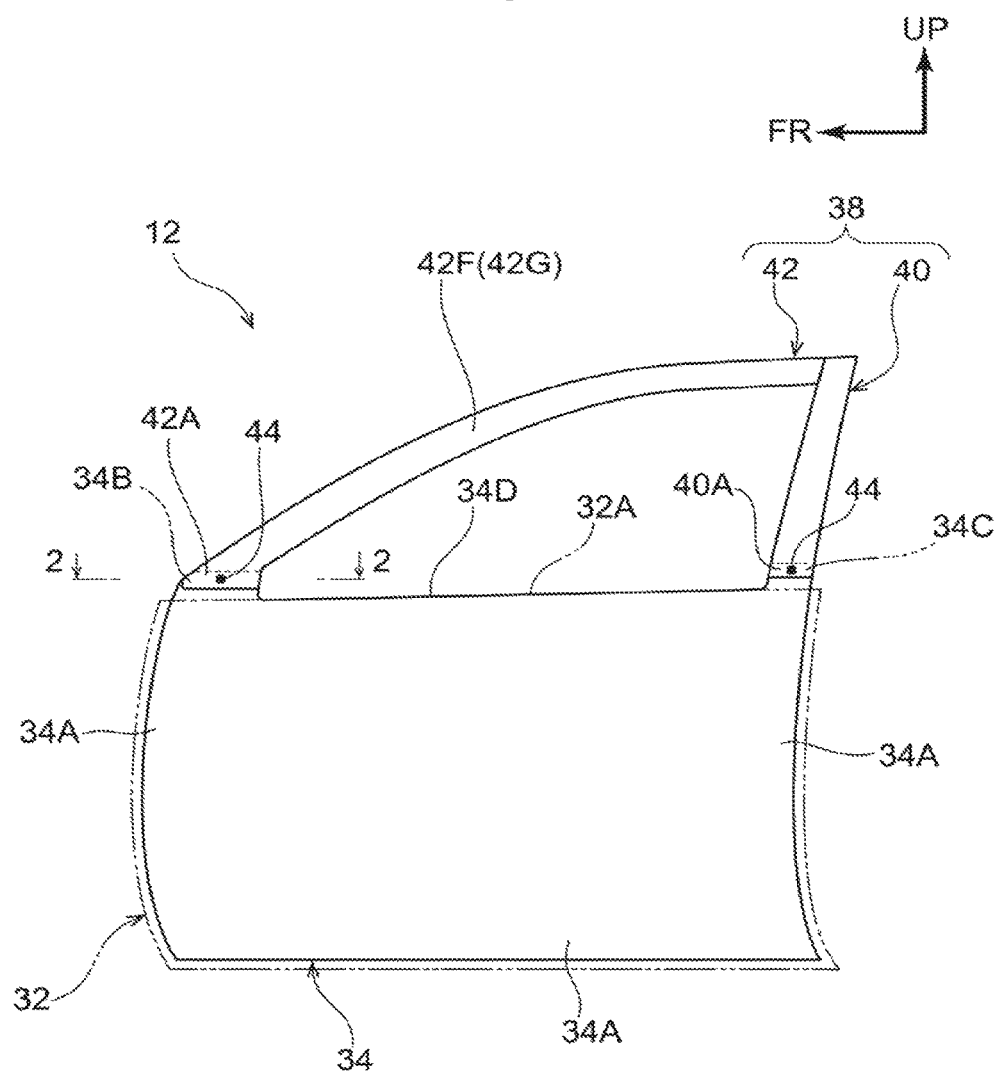
FIG. 1 is a side view showing a side door at which a vehicle door structure in accordance with a first exemplary embodiment is employed.
Figure 2:
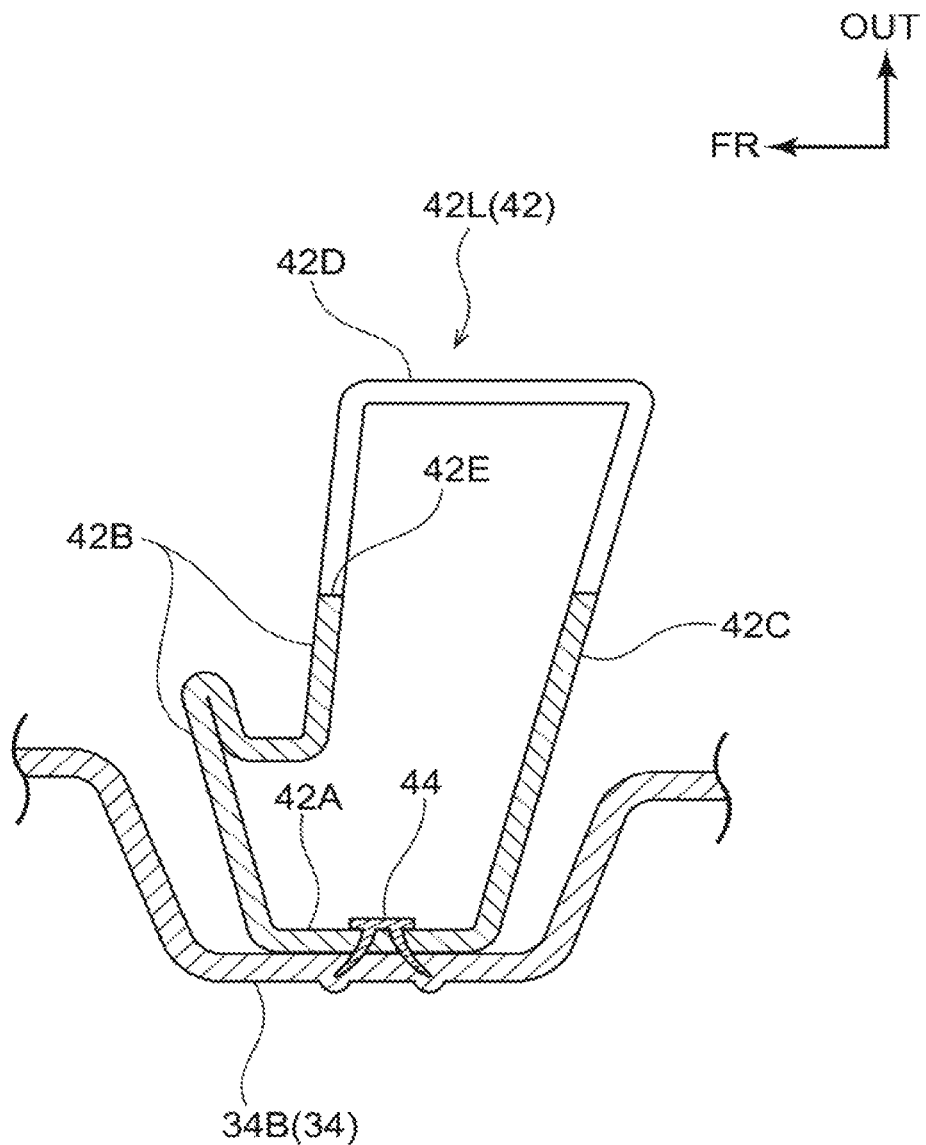
FIG. 2 is a magnified sectional diagram showing a magnification of a sectional view of the side door, cut along line 2-2 in FIG. 1.
Figure 3:
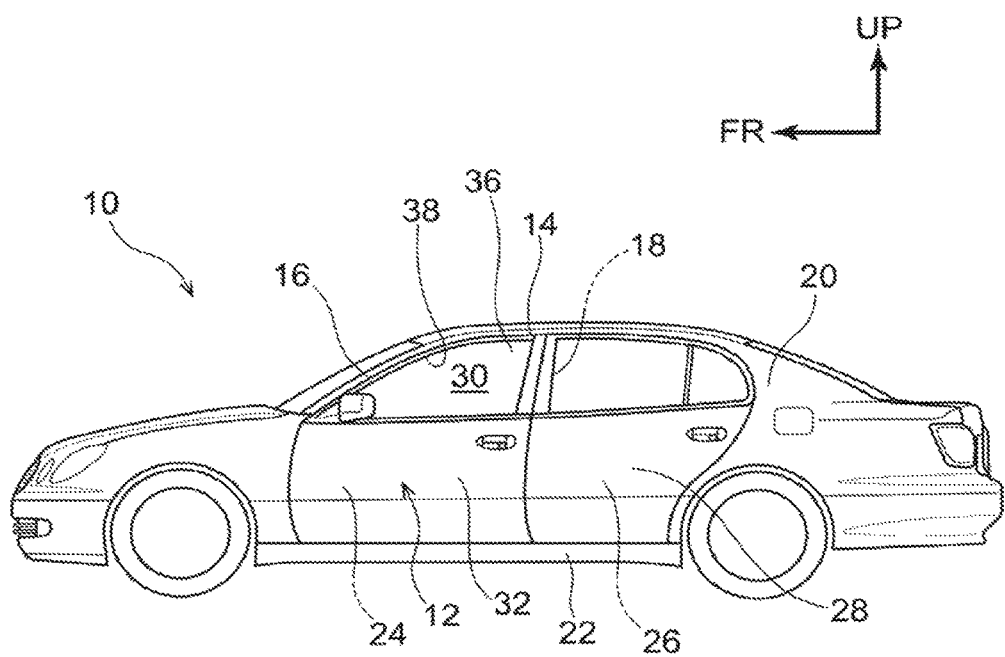
FIG. 3 is a side view showing a vehicle equipped with the side door at which the vehicle door structure in accordance with the first exemplary embodiment is employed.

A vehicle door structure according to a first exemplary embodiment of the present disclosure is described using FIG. 1 to FIG. 3. An arrow FR, an arrow UP and an arrow OUT that are shown where appropriate in the drawings indicate, respectively, a forward direction (progress direction) of the vehicle, an upward direction and an outward direction in the vehicle width direction. Hereinafter, where descriptions are given simply indicating the directions front and rear, left and right, and up and down, unless specifically stated otherwise, these indicate front and rear in the vehicle front-and-rear direction, left and right in the vehicle left-and-right direction (the vehicle width direction), and up and down in the vehicle vertical direction.

As shown in FIG. 3, the vehicle door structure according to the present exemplary embodiment is employed at a front side door 12 that opens and closes a front side door aperture portion 24 formed in a side portion of a vehicle 10. The front side door 12 serves as a door for a vehicle, and the front side door aperture portion 24 serves as a door aperture portion. General structure of the side portion of the vehicle 10 is described below, and then structure of the front side door 12 is described.

Structure of Side Portion of the Vehicle 10

A roof side rail 14, a front pillar 16, a center pillar 18 and a rear pillar 20 are provided at the side portion of the vehicle 10. The roof side rail 14 extends in the vehicle front-and-rear direction. The front pillar 16, center pillar 18 and rear pillar 20 extend toward the lower side from, respectively, the front end, a front-and-rear direction central portion and the rear end of the roof side rail 14. A rocker 22 that links lower end portions of the front pillar 16, center pillar 18 and rear pillar 20 in the front-and-rear direction is also provided at the side portion of the vehicle 10. The front side door aperture portion 24 is formed by the roof side rail 14, the front pillar 16, the center pillar 18 and the rocker 22. A rear side door aperture portion 26, which serves as a side door aperture portion, is formed by the roof side rail 14, the center pillar 18, the rear pillar 20 and the rocker 22. The front side door aperture portion 24 and the rear side door aperture portion 26 are opened and closed by the front side door 12 and a rear side door 28.

Structure of the Front Side Door 12

As shown in FIG. 1, the front side door 12 is provided with a door outer panel 32 and a door inner panel 34. The door outer panel 32 is disposed at the vehicle width direction outer side of the front side door 12 and constitutes part of the exterior design of the vehicle 10 (see FIG. 3). The door inner panel 34 is disposed at the vehicle width direction inner side relative to the door outer panel 32 (at a cabin 30 (see FIG. 3)) and is joined to the door outer panel 32. The front side door 12 is further provided with a door frame 38 that is formed in a substantial "U" shape opening to the lower side in a vehicle side view and that serves as a frame portion structuring a frame for a front side door glass 36 (see FIG. 3).

The door outer panel 32 is formed by press working or the like of a plate-shaped member that is formed using an aluminium alloy. The door outer panel 32 is formed in a rectangular shape in a vehicle side view, the longer direction of which is in the front-and-rear direction.

Similarly to the door outer panel 32, the door inner panel 34 is formed by press working or the like of a plate-shaped member formed using an aluminium alloy. The door inner panel 34 is formed in a rectangular shape that corresponds with the shape of the door outer panel 32 in the vehicle side view. A front end portion, lower end portion and rear end portion of the door inner panel 34 are formed as door outer panel joining portions 34A to which the door outer panel 32 is joined. A front end portion, lower end portion and rear end portion of the door outer panel 32 are joined to the door outer panel joining portions 34A of the door inner panel 34 by hemming or the like of the front end portion, lower end portion and rear end portion of the door outer panel 32. Between the door outer panel 32 and the door inner panel 34, the front side door glass 36 (see FIG. 3), a door glass raising and lowering apparatus that raises and lowers the front side door glass 36, a door lock apparatus that retains the front side door 12 at a closed position, and suchlike are provided.

A first join-receiving portion 34B is provided at a front end portion of the door inner panel 34. The first join-receiving portion 34B protrudes further to the upper side in the vehicle side view than an upper side end 32A of the door outer panel 32 that has been joined to the door inner panel 34. A second join-receiving portion 34C is provided at a rear end portion of the door inner panel 34. The second join-receiving portion 34C protrudes further to the upper side than the upper side end 32A of the door outer panel 32. An upper side end 34D of the door inner panel 34 is provided at a central portion in the front-and-rear direction between the location at which the first join-receiving portion 34B is provided and the location at which the second join-receiving portion 34C is provided. The upper side end 34D of the door inner panel 34 and the upper side end 32A of the door outer panel 32 are disposed at substantially the same position in the vertical direction.

The door frame 38 is provided with an upright frame portion 40 and a curved frame portion 42. The upright frame portion 40 extends in the vertical direction. From an end portion at the upper side of the upright frame portion 40, the curved frame portion 42 extends in a curve to the vehicle lower side toward the vehicle front side.

The upright frame portion 40 is formed using a steel material, which is a material with a smaller thermal expansion coefficient than the aluminium alloy(s) forming the door inner panel 34 and the door outer panel 32. For example, the upright frame portion 40 is formed by roll-forming or the like of steel plate; a cross section of the upright frame portion 40 viewed from the upper side is formed as a substantially rectangular cross section. An end portion at the vehicle lower side of the upright frame portion 40 is a second joining portion 40A, which is joined by one of self-piercing rivets 44 to the second join-receiving portion 34C of the door inner panel 34. The self-piercing rivet 44 serves as a rivet. The upright frame portion 40 may also be constituted by extrusion molding, and the upright frame portion 40 may be constituted by combining plural pressed components formed by press working.

The curved frame portion 42 is formed by roll-forming or the like of steel plate, similarly to the upright frame portion 40. The curved frame portion 42 is formed in a shape that corresponds with the front pillar 16 (see FIG. 3). That is, the curved frame portion 42 is curved in a shape that protrudes toward the opposite side thereof from the door inner panel 34. An upper end portion (rear end portion) of the curved frame portion 42 is joined to the upper end portion of the upright frame portion 40 by welding or the like.

As shown in FIG. 2, a cross section of the curved frame portion 42 cut along a direction orthogonal to the length direction of the curved frame portion 42 is formed as a hollow, substantially rectangular cross section. A lower end portion 42L of the curved frame portion 42 is provided with a first joining portion 42A, a pair of side wall portions 42B and 42C, and an outer wall portion 42D. The first joining portion 42A is arranged along a face at the vehicle width direction outer side of the first join-receiving portion 34B of the door inner panel 34 and is joined by one of the self-piercing rivets 44 to the first join-receiving portion 34B. The pair of side wall portions 42B and 42C extend to the vehicle width direction outer side from a front portion and rear portion, respectively, of the first joining portion 42A. The outer wall portion 42D links between the pair of side wall portions 42B and 42C in the front-and-rear direction. Regions at the vehicle width direction outer side of lower end portions of the pair of side wall portions 42B and 42C and the lower end portion of the outer wall portion 42D are cut away (this cutaway region is referred to as the "cutaway portion 42E"). Hence, a tool for applying the self-piercing rivet 44 may be inserted through the cutaway portion 42E toward the first joining portion 42A. Regions of the pair of side wall portions 42B and 42C at the vehicle width direction inner side relative to the region at which the cutaway portion 42E is formed become more distant from one another in the vehicle front-and-rear direction toward the vehicle width direction outer side. Therefore, the tool for applying the self-piercing rivet 44 may be easily inserted toward the first joining portion 42A. The lower end portion of the upright frame portion 40 has a similar structure to the lower end portion 42L of the curved frame portion 42. The curved frame portion 42 may also be constituted by extrusion molding using a steel material, and the curved frame portion 42 may be constituted by combining plural pressed components formed by press working.

As shown in FIG. 1, in the present exemplary embodiment, the first joining portion 42A and second joining portion 40A of the door frame 38 are joined to the first join-receiving portion 34B and second join-receiving portion 34C, respectively, of the door inner panel 34 in a state in which the first joining portion 42A and second joining portion 40A of the door frame 38 are disposed at the same position in the vehicle vertical direction.

Operation and Effects of the Present Exemplary Embodiment

Now, operation and effects of the present exemplary embodiment are described.

As shown in FIG. 1, in the front side door 12 in which the vehicle door structure according to the present exemplary embodiment is employed, the door outer panel 32 is joined to the door inner panel 34, and the first joining portion 42A and second joining portion 40A of the door frame 38 are joined to the first join-receiving portion 34B and second join-receiving portion 34C, respectively, of the door inner panel 34 with the self-piercing rivets 44. Thus, the door outer panel 32, the door inner panel 34 and the door frame 38 are made integral.

In the present exemplary embodiment, the door frame 38 is fabricated of steel and the door inner panel 34 is fabricated of aluminium alloy. Therefore, when the front side door 12 whose structure includes the door frame 38 and the door inner panel 34 is warmed or cooled, the door frame 38 and the door inner panel 34 act to expand or contract by mutually different proportions. Consequently, because the expansion or contraction of the door inner panel 34 is restricted by the door frame 38 (and the expansion or contraction of the door frame 38 is restricted by the door inner panel 34), the locations of the door inner panel 34 to which the door frame 38 is joined (i.e., the first join-receiving portion 34B and the second join-receiving portion 34C) and surrounding portions are deformed.

In the present exemplary embodiment, the first join-receiving portion 34B and second join-receiving portion 34C provided at the door inner panel 34 protrude further to the vehicle upper side than the upper side end 32A of the door outer panel 32, as viewed from the vehicle outer side. Therefore, restriction by the door frame 38 of expansion or contraction of a region of the door inner panel 34 that opposes the door outer panel 32 is moderated. As a result, the region of the door inner panel 34 that opposes the door outer panel 32 may expand or contract to follow the door outer panel 32. Consequently, warping of the door outer panel 32 in response to temperature changes of the front side door 12 may be suppressed.

Vehicle Door Structure According to Second Exemplary Embodiment

Figure 4:
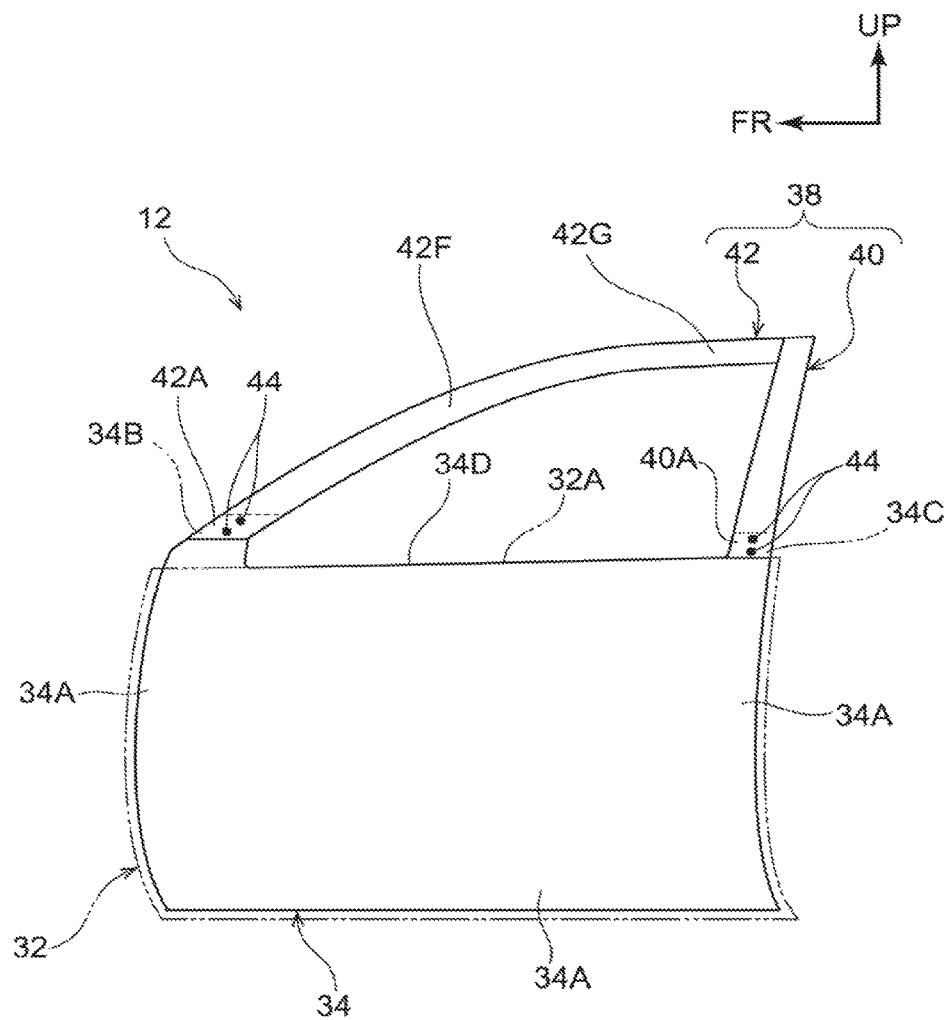
FIG. 4 is a side view, corresponding to FIG. 1, showing a side door at which a vehicle door structure in accordance with a second exemplary embodiment is employed.

Now, a vehicle door structure according to a second exemplary embodiment of the present disclosure is described using FIG. 4. Members and portions with the same functionality as in the exemplary embodiment described above are assigned the same reference numerals as in the above exemplary embodiment and are not described here.

As shown in FIG. 4, in the front side door 12 in which the vehicle door structure according to the present exemplary embodiment is employed, the first joining portion 42A of the door frame 38 and the first join-receiving portion 34B of the door inner panel 34 are joined by two of the self-piercing rivets 44, which are disposed to be spaced apart in the vehicle vertical direction. In addition, the second joining portion 40A of the door frame 38 and the second join-receiving portion 34C of the door inner panel 34 are joined by two of the self-piercing rivet 44s, which are disposed to be spaced apart in the vehicle vertical direction. In the front side door 12 according to the present exemplary embodiment, the first joining portion 42A and second joining portion 40A of the door frame 38 are joined to the first join-receiving portion 34B and second join-receiving portion 34C, respectively, of the door inner panel 34 in a state in which the first joining portion 42A of the door frame 38 is disposed at the vehicle upper side relative to the second joining portion 40A of the door frame 38.

In the present exemplary embodiment described above, the numbers of the self-piercing rivets 44 joining the first joining portion 42A of the door frame 38 with the first join-receiving portion 34B of the door inner panel 34 and the second joining portion 40A of the door frame 38 with the second join-receiving portion 34C of the door inner panel 34 are made plural. Therefore, joining strength between the door inner panel 34 and the door frame 38 is improved compared to the first exemplary embodiment. Furthermore, because the pairs of self-piercing rivets 44 joining the first joining portion 42A of the door frame 38 with the first join-receiving portion 34B of the door inner panel 34 and the second joining portion 40A of the door frame 38 with the second join-receiving portion 34C of the door inner panel 34 are arranged in the vertical direction, increases in front-and-rear direction dimensions of the first joining portion 42A and second joining portion 40A of the door frame 38 may be suppressed. Hence, a narrowing of a field of view from the cabin 30 (see FIG. 3) may be suppressed.

In a structure in which the first joining portion 42A and second joining portion 40A of the door frame 38 have been joined to the first join-receiving portion 34B and second join-receiving portion 34C, respectively, of the door inner panel 34 in a state in which the first joining portion 42A and second joining portion 40A of the door frame 38 are disposed at the same position in the vehicle vertical direction, as in the first exemplary embodiment shown in FIG. 1, when the front side door 12 is warmed or cooled, the door frame 38 is deformed with a central portion 42F in the front-and-rear direction of the curved frame portion 42 acting as a deformation origin 42G.

In contrast, in the present exemplary embodiment shown in FIG. 4, the first joining portion 42A and second joining portion 40A of the door frame 38 are joined to the first join-receiving portion 34B and second join-receiving portion 34C, respectively, of the door inner panel 34 in the state in which the first joining portion 42A of the door frame 38 is disposed at the vehicle upper side relative to the second joining portion 40A of the door frame 38. Hence, the deformation origin 42G of the door frame 38 when the front side door 12 is warmed or cooled may be shifted toward the side of the curved frame portion 42 at which the upright frame portion 40 is disposed. Thus, a narrowing or widening of a predetermined clearance between the central portion 42F of the curved frame portion 42 of the door frame 38 and the front pillar 16 (see FIG. 3) when the front side door 12 is warming or cooling may be reduced.

In the present exemplary embodiment, an example is described in which the first joining portion 42A of the door frame 38 is joined to the first join-receiving portion 34B of the door inner panel 34 and the second joining portion 40A of the door frame 38 is joined to the second join-receiving portion 34C of the door inner panel 34 by respective plural numbers of the self-piercing rivets 44. However, the present disclosure is not limited thus. For example, the first joining portion 42A of the door frame 38 may be joined to the first join-receiving portion 34B of the door inner panel 34 by one or a plural number of the self-piercing rivets 44, and the second joining portion 40A of the door frame 38 may be joined to the second join-receiving portion 34C of the door inner panel 34 by one or a plural number of the self-piercing rivets 44.

In the first exemplary embodiment and second exemplary embodiment described above, examples are described in which the vehicle door structure of the present disclosure is applied to the front side door 12, but the present disclosure is not limited thus. For example, the vehicle door structure of the present disclosure may be applied to the rear side door 28 shown in FIG. 3, a rear end door of a hatchback-type vehicle or the like.

In the first exemplary embodiment and second exemplary embodiment described above, examples are described in which the door outer panel 32 and door inner panel 34 are formed using aluminium alloy, but the present disclosure is not limited thus. For example, the door outer panel 32 and door inner panel 34 may be formed using fiber-reinforced resin.

Exemplary embodiments of the present disclosure are described hereabove. However, the present disclosure is not limited by these descriptions and it will be clear that numerous modifications beyond these descriptions may be embodied within a technical scope not departing from the spirit of the disclosure.

What is claimed is:

1. A door structure for a vehicle, comprising:
a door outer panel that structures a portion of a door for a vehicle and is disposed at a vehicle outer side thereof, the door for a vehicle opening and closing a door aperture portion provided in the vehicle;
a door inner panel that is disposed at a vehicle inner side relative to the door outer panel and is joined to the door outer panel, the door inner panel including
a first join-receiving portion that, viewed from the vehicle outer side, protrudes to a vehicle upper side relative to a vehicle upper side end of the door outer panel, and
a second join-receiving portion that, viewed from the vehicle outer side, protrudes to the vehicle upper side relative to the vehicle upper side end of the door outer panel and that is disposed to be spaced apart from the first join-receiving portion in a vehicle horizontal direction along the vehicle upper side end of the door outer panel; and
a frame portion that is formed using a material with a different thermal expansion coefficient from the door inner panel, the frame portion having a hollow closed cross section cut along a direction orthogonal to a length direction of the frame portion, the frame portion including a first joining portion that is joined to the first join-receiving portion by a rivet and a second joining portion that is joined to the second join-receiving portion by a rivet, and a lowermost edge of the frame portion is separated upward in a vehicle vertical direction from a lowermost edge of a plurality of edges forming an aperture for a door glass of the door.

2. The door structure for a vehicle according to claim 1, wherein at least one of the first joining portion with the first join-receiving portion and the second joining portion with the second join-receiving portion is joined by a plurality of rivets spaced apart in the vehicle vertical direction.

3. The door structure for a vehicle according to claim 2, wherein:
the frame portion includes
an upright frame portion that extends to the vehicle upper side from the second join-receiving portion, and
a curved frame portion that extends toward the first join-receiving portion from an end portion at the vehicle upper side of the upright frame portion, a central portion in a length direction of the curved frame portion being curved in a shape that protrudes toward the opposite side of the curved frame portion from a side at which the door inner panel is disposed; and
an end portion at a vehicle lower side of the curved frame portion includes the first joining portion, and an end portion at a vehicle lower side of the upright frame portion includes the second joining portion.

4. The door structure for a vehicle according to claim 3, the first joining portion is joined to the first join-receiving portion and the second joining portion is joined to the second join-receiving portion when the first joining portion is disposed at the vehicle upper side relative to the second joining portion.

5. The door structure for a vehicle according to claim 1, wherein:
the frame portion includes
an upright frame portion that extends to the vehicle upper side from the second join-receiving portion, and
a curved frame portion that extends toward the first join-receiving portion from an end portion at the vehicle upper side of the upright frame portion, a central portion in a length direction of the curved frame portion being curved in a shape that protrudes toward an opposite side of the curved frame portion from a side at which the door inner panel is disposed; and
an end portion at a vehicle lower side of the curved frame portion includes the first joining portion, and an end portion at a vehicle lower side of the upright frame portion includes the second joining portion.

6. The door structure for a vehicle according to claim 5, wherein the first joining portion is joined to the first join-receiving portion and the second joining portion is joined to the second join-receiving portion when the first joining portion is disposed at the vehicle upper side relative to the second joining portion.

* * * * *